United States Patent
Roy et al.

(10) Patent No.: US 8,943,602 B2
(45) Date of Patent: Jan. 27, 2015

(54) METHOD FOR ENHANCING PRIVACY OF INTERNET BROWSER USERS

(76) Inventors: Sanjay K. Roy, Palmetto Bay, FL (US); Achyut K. Roy, Pune (IN)

(\*) Notice: Subject to any disclaimer, the term of this patent is extended or adjusted under 35 U.S.C. 154(b) by 258 days.

(21) Appl. No.: 13/535,800

(22) Filed: Jun. 28, 2012

(65) Prior Publication Data

US 2013/0067588 A1  Mar. 14, 2013

Related U.S. Application Data

(60) Provisional application No. 61/533,275, filed on Sep. 12, 2011.

(51) Int. Cl.
G06F 7/04 (2006.01)
H04L 29/06 (2006.01)
G06F 21/62 (2013.01)

(52) U.S. Cl.
CPC ............ H04L 63/04 (2013.01); G06F 21/6263 (2013.01); H04L 63/1441 (2013.01)
USPC .......................................................... 726/26

(58) Field of Classification Search
None
See application file for complete search history.

(56) References Cited

U.S. PATENT DOCUMENTS

| 7,689,627 B2 | 3/2010 | McAfee |
| 7,805,608 B2 | 9/2010 | Chow |
| 7,962,603 B1 | 6/2011 | Morimoto |
| 7,979,909 B2 | 7/2011 | Jancula |
| 8,302,169 B1 * | 10/2012 | Presotto et al. ................... 726/5 |

OTHER PUBLICATIONS

Daniel C. Howe and Helen Nissenbaum, Trackmenot: Resisting Surveillance in Web Search Lessons from the Identity Trail: Anonymity, Privacy, and Identity in a Networked Society Oxford University Press (2009), pp. 417-436, edited by Ian Kerr, Valerie Steeves, Carole Lucock Also available at: http://www.idtrail.org/content/view/799.

\* cited by examiner

*Primary Examiner* — Brandon Hoffman
(74) *Attorney, Agent, or Firm* — Levisohn Berger LLP

(57) ABSTRACT

A method for enhancing the privacy of individuals who may be tracked while visiting different sites on the Internet using conventional browsers is disclosed. The method is based on randomizing the information collected in cookies that are used for tracking by different websites.

7 Claims, 1 Drawing Sheet

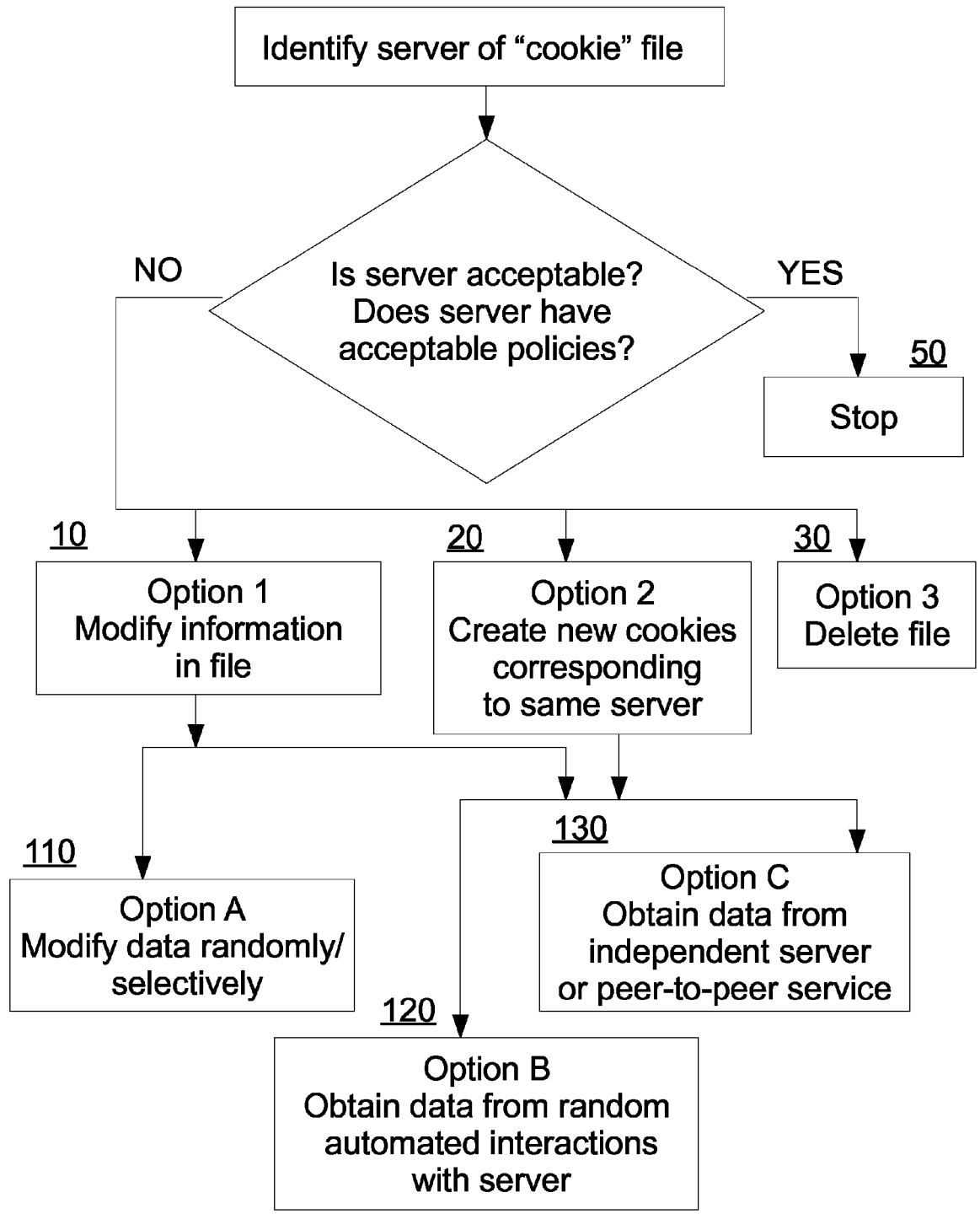

METHOD FOR ENHANCING PRIVACY OF INTERNET BROWSER USERS

RELATED APPLICATIONS

This application claims the benefit of U.S. Provisional Patent Appl. Ser. No. 61/533,275, filed on Sep. 12, 2011—the contents of which are incorporated by reference herein.

FIELD OF THE INVENTION

This invention is related to the field of software packages known as Internet browsers, more specifically, to a system and method off enhancing the privacy of individuals using these browsers.

BACKGROUND OF THE INVENTION

The Internet is an electronic workplace within which a variety of business transactions, research, personal and business communications, etc., are conducted. Given the wide range of applications and individual preferences/requirements, it is inevitable that there are conflicting interests amongst the different users. A particular important area of concern here is the issue of privacy. Problems arise here since communications between different users are done using electronic means, typically using software programs known as browsers.

In order to appreciate the privacy issue, it is useful the consider user communications and transactions on the Internet. An individual wishing to interact with an business (or research site, etc.) uses a browser installed on their computer or phone, etc. (the "client") to communicate with an internet website set up by the business for this purpose on their computer system(s) (the "server"). Since a server website may interact with a large number of clients at any given time, it is advantageous for the server to keep track of different users so that information requests by the client can be serviced as quickly as possible. This is typically done using small electronic files ("cookies") containing client-identifying information that are created by the server and stored on the clients' computer (or phone, etc. ("internet communication apparatus")). The information in the cookies is then sent with client information requests to the server to permit it to fulfill these requests efficiently.

Cookies are often stored temporarily, i.e. the server deletes them once a user session is complete.

However, persistent cookies that remain permanently (or for extended periods) on the clients' computer or phone, etc., are used more often than temporary session cookies. These cookies allow the server to continue servicing user requests in later sessions based on previous interactions with the client. This can be a major advantage to both parties in many cases since both the server and the client can continue interacting over extended periods of time without having to re-enter information that may have been exchanged in a previous session.

In practice, cookies are used not only for assisting in servicing user requests, but also for businesses to enhance their overall operations. A common use of the cookies is to predict user interests on the basis of their information requests. Businesses then use this information to advertise products that they believe may be of interest to the user, but which may not have been part of the original user request. In many cases, businesses may also sell information on user interests to other businesses, who in turn may advertise additional products to the user. In most cases, this may not be a significant issue for the user, but may be beneficial since it may assist him/her in locating the product/information more quickly than would otherwise be possible.

In an ideal situation, no real issues are expected even when the unsolicited information is not useful, since the user is known to the server (and other third parties) only through the limited information stored in the cookie. In practice however, problems arise since the user may provide personally identifying information to the server, for example, through a purchase request. When such information is combined with cookies placed by different websites, it may be possible for a server to keep track of an identifiable client as he/she conducts various activities across different websites on the Internet.

The above issue is usually not a problem since most reputable websites (servers) do not track client web usage across different sites. The client may also delete the cookie file(s) to prevent this type of tracking. Unfortunately, this situation has been changing in recent years as many websites attempt to track users web usage via the cookies set by different servers. If cookies are deleted, the information is often recreated using other identifying information such as client browser settings, IP numbers, etc., and cookies are then reset to permit further tracking. This can result in loss of privacy for the client since the information aggregated by the tracking server can be sold to a wide variety of unknown third parties who may have motives that are not in the best interests of the client. Given this problem, there is now increasing interest in developing methods that can prevent tracking of individual interactions on the Internet.

DESCRIPTION OF THE PRIOR ART

The practice of tracking individual interactions on the Internet has been limited to date due to generally accepted business practices that considers this to be unethical. As a result, work on preventing tracking has also been limited. U.S. Pat. Nos. 7,979,909 and 7,805,608 both propose the use of encrypted data in cookies to prevent third-party tracking (or other unwanted activities). U.S. Pat. No. 7,805,608 goes further by storing the encryption key only on the client side to ensure that the cookie information can be decrypted by the server only when the client sends the encryption key with an information request. In another approach, U.S. Pat. No. 7,962,603 explicitly requires that unique identifiers for each client (e.g. IP address) be erased when the browser is shut down.

In contrast to these server driven approach, a client-driven method for limiting tracking has been described in U.S. Pat. No. 7,689,627. In this technique, a client creates multiple password-protected identities on a web browser. Since different identities are used during different browsing sessions, the amount of personal information that can be obtained by tracking is limited to that associated with one of the many different identities. There are also websites that exist to reduce tracking by specific websites. For example, wwww.scroogle.org acts as an intermediary for users of the well-known search engine, www.google.com, thereby preventing tracking of the user by the search-engine itself. However, this type of approach cannot be used on a wider basis.

SUMMARY OF THE INVENTION

There are no legal or technical means for completely preventing tracking at this time. As a result, it is becoming increasingly prevalent, and some well-known, large corporations are known to have used this practice without informing the user community. Given competitive pressures and increasing numbers of unscrupulous businesses, it is likely that tracking will continue to increase in the future. Unfortunately, as mentioned above, methods for preventing tracking are generally implemented voluntarily by the servers. Alternative client-based approaches such as the one described above have limited scope, and requires that the user (client) take special efforts to reduce tracking. This is not a good situation for most Internet users.

Given the limited options available for reducing/minimizing unwanted tracking at the present time, a new method for doing so is being presented in this disclosure. This method is meant to be implemented by individual users (the client), and is designed to create strong disincentives for businesses that use this practice. This is accomplished by making the results of any tracking extremely unreliable by systematically reducing the quality of information stored in these cookies. This degradation of information content is achieved in the disclosed method by using two means:

(a) modifying the information in existing cookies, and (b) adding new cookies with information that is not related to client interactions on the Internet.

Both these are done using an approach that is not easily detectable by a tracking system. At the same time, select cookies can be deleted if necessary. Since a brute-force method such as cookie deletion is not used, the tracking system cannot readily determine which (if any) of the cookies are relevant. Thus, the invention serves multiple goals:

Since the information collected cannot be related to a given user/client with any degree of confidence, it becomes useless from a business perspective.

Even if the tracking system can identify cookie modifications, the cost of tracking may become so excessive that it may not be worthwhile for a business to do so.

Since implementation of the method may adversely affect large businesses that use the cookies for legitimate purposes, they may either encrypt their cookies to ensure that they are not misused (vis-a-vis user tracking) and/or force more ethical business practices from the entire business community.

All the above will ultimately reduce/eliminate unwanted tracking of users on the Internet.

BRIEF DESCRIPTION OF THE DRAWINGS

FIG. 1 shows a block diagram showing an implementation of the inventive method according to an embodiment of the invention.

DETAILED DESCRIPTION

Tracking is achieved by using data from client-side cookies that are placed by different servers for a number of legitimate purposes. Since this data can be misused by entities that choose to track individual interactions on the internet without their consent, the simplest approach to minimize tracking is to ensure that all cookies are encrypted so that they are available for use only by select servers. Unfortunately, this cannot be enforced by the client since cookies are generated and placed by different servers based on their own policies over which the client has minimal control. Deleting cookies is a brute-force approach that can work under certain circumstances, but websites/servers have developed techniques to overcome this method with relatively limited effort. (Note that the term "cookie" or "cookies" herein refer to an electronic file(s) containing client-identifying information that are created by the server and stored on the client's computer or other Internet communication apparatus.)

Given the above, the approach taken here is to modify and/or add data/cookies selectively in order to effectively reduce the useful information content of the cookies. This is done as follows:

Referring to FIG. 1, when the software detects a cookie, it identifies its server and determines whether or not such server has acceptable policies. If the server does not have acceptable policies, then processing steps are taken to modify 10 and/or add data/cookies 20. Acceptable privacy policies refers to a determination made by the software that the server hosting a cookie has in place one or more policies, safeguards or the like—which the software/user/client deems to be sufficient to protect a client/user from intrusive practices by the server. For example, such policies or safeguards may include, but are not limited to, a determination that: 1) a cookie is a "session cookie" 2) a cookie is a "first party cookie" 3) and/or a cookie has an expiration date that does not exceed a predefined number of months from creation". Any or all of such server policies or rules to protect a client/user with respect to cookies are referred to herein as "acceptable privacy policies."

1. Cookies from different websites can be modified and/or replaced randomly such that the information in them is unrelated to user interests/user interactions with them. This can be done using one or more of the following techniques:

a. The data can be modified on a continuing basis 110 by a software program/module developed for this purpose that runs in the background with the browser (e.g. as an plug-in or add-on). Select user/client-identifiable information such as IP addresses can be left unchanged so that it will not be readily evident to any tracking software that the information has been changed. Other information that is related to the server/website interaction, but not related to the client/user itself can be changed (and/or deleted selectively/randomly).

b. Cookies from the same server/web-site, but applicable to an unrelated random user can be used to replace the existing cookie. Cookies from other random users can be obtained as follows:

(i) A dummy user is set up by the client to randomly visit different websites on a continuing basis and conduct random interactions with the website 120. These may consist of random searches at a search engine site, random product inquiries at shopping sites, random news/entertainment item requests at entertainment/news delivery sites, etc. The simplest approach here is to use an automated program written for this purpose. Cookies related to these continuing random visits can be used as replacements.

(ii) A separate entity whose primary goal is to collect and redistribute cookies via a specific server site can be set up for users who wish to have their cookies replaced/randomized 130. In this case, the server can copy/collect cookies from visitors and randomly redistribute them on a continuing basis. Such a site can be set up as a non-profit site or a user or an advertisement supported site. This site can also collect random cookies directly from different websites for redistribution as described in (i) above.

(iii) A peer-to-peer network 130 can be set up by different users to randomly exchange cookies amongst each other.

2. Additional random cookies can be added on the client machine to further devalue the information content of the cookies from a tracking perspective 20. This can be done using one or more of the techniques described in (1b) above.

3. Cookies from sites that are visited rarely (including encrypted cookies) can be deleted based on a user/softwareset policy 30, for example, sites that are not known to have (or do not have) a "no-tracking" policy can be deleted (possibly randomly).

Sites/servers that are important from the user perspective, i.e. those with which the user/client has a long-standing relationship (e.g. banking, bill-paying), can be identified during program setup and/or at a later time by updating preference modifications. In particular, encrypted cookies from these sites can be left unchanged since this permits quick, efficient interaction with these websites without third-party tracking (except superficially). A similar policy can be used for cookies from other sites that have a user/client approved/acceptable cookie setting/usage policies 50.

Information that can be used by the user/client to determine the policies of various websites/servers can be obtained from the websites themselves as well as from independent sources and personal experiences. In the long-term, it is likely that such information can be uploaded from select, trusted websites, and the preferences can then be set in an automated manner by the software itself.

Any server with the goal of tracking a user with randomized cookies as described above will face a number of problems. As the business market becomes aware of client-side cookie randomizing programs, the server will be unable to guarantee the quality of the data that it collects. Thus, the market for its data will be rapidly reduced with time. The business may then attempt to identify which (if any) cookies are randomized for any given client so that they can restart tracking from a previous time. However, this is not easy either since the server will have to identify when the randomizing was initiated by the client. Even if the server is successful in this, the information that the server may have is likely to be out-dated and of little business value as client interests can be expected to change with time. Thus, tracking individuals beyond a certain point may become impossible (or at least, non-viable from a business perspective).

Even as the business model of tracking individuals becomes less viable, competing businesses may also play a role in reducing tracking. Large companies that depend on cookies as part of their business may then be forced to encrypt their cookies in a manner that they cannot be used by third party trackers. Since this has its costs, it may not be a preferred option, and these companies may then use their business status/influence to develop a "no-tracking" code of conduct for the entire internet community regardless of the method of tracking (i.e. regardless of whether the methods are based on cookies or not). In either case, the user/client benefits since unwanted tracking is reduced (or eliminated in the best case scenario).

While the invention has been described and disclosed in various terms or certain embodiments, the scope of the invention is not intended to be, nor should it be deemed to be limited thereby, and such other modifications or embodiments as may be suggested by the teachings herein are particularly reserved especially as they fall within the breadth and scope of the claims here appended.

What is claimed is:

1. A method for reducing online tracking of an individual user/client by Internet based websites/servers that use data in cookies on the client Internet communication apparatus, comprising the steps of
    detecting a cookie on said Internet communication apparatus,
    identifying a website/server setting said cookie and determining if said website/server setting said cookie does not have acceptable privacy policies and based on said determination of unacceptable privacy policies, further comprising the steps of
    replacing part or all of said data in one or more of said cookies with data that is unrelated to user/client interaction with said website/server and that do not result from direct interactions between said user/client and said website/server, and
    adding one or more cookies on the client internet communication apparatus that are not related to said user/client's interactions with said websites/servers and are not set directly by said websites/servers, and
    said unrelated data and said additional cookies are obtained by using information provided to said user/client by either a separate server/website on the internet, said separate server/website being independent of said internet based websites/servers and interacting independently with them or by multiple users/clients on the internet that obtain cookies independently from said internet based websites/servers and other said multiple users/clients.

2. The method of claim 1, comprising the additional prior step of having the said user/client identify preferred Internet based websites/servers, and wherein said cookies selected for data replacement are restricted to only those cookies that are not set by said preferred internet based websites/servers.

3. The method of claim 1, comprising the additional step of deleting one or more of said cookies from said client Internet communication apparatus.

4. A software program implementing a method for reducing online tracking of an individual user/client by Internet based websites/servers that use data in cookies on a client internet communication apparatus, that comprises:
    software configured to replace part or all of said data in one or more of said cookies with data that is unrelated to user/client interaction with said website/server, and that do not result from direct interactions between said user/client and said website/server, and
    software that is configured to add one or more cookies on the client Internet communication apparatus that are not related to said user/client's interactions with said websites/servers and are not set directly by said websites/servers, and
    said unrelated data and said additional cookies are obtained by using information provided to said user/client by either a separate server/website on the internet, said separate server/website being independent of said internet based websites/servers, and interacting independently with them or by multiple users/clients on the Internet that obtain cookies independently from said internet based websites/servers and other said multiple users/clients.

5. The software program of claim 4, whereby said software is configured to perform the additional prior step of having the said user/client or said software program identify preferred Internet based websites/servers, and wherein said cookies selected for data replacement are restricted to only those cookies that are not set by said preferred internet based websites/servers.

6. The software program of claim 4 whereby said software is configured to perform the additional step of deleting one or more of said cookies from said client Internet communication apparatus.

7. A user/client Internet communication apparatus comprising a software program that implements a method for reducing online tracking of an individual user/client by internet based websites/servers that use data in cookies on the client internet communication apparatus, that utilizes at least one of the steps of replacing part or all of said data in one or more of said cookies with data that is unrelated to user/client interaction with said website/server, and that do not result from direct interactions between said user/client and said website/server, and adding one or more cookies on the client internet communication apparatus that are not related to said user/client's interactions with said websites/servers and are not set directly by said websites/servers, and said unrelated data and said additional cookies are obtained by using information provided to said user/client by either a separate server/website on the internet, said separate server/website being independent of said Internet based websites/servers, and interacting independently with them or by multiple users/clients on the internet that obtain cookies independently from said internet based websites/servers and other said multiple users/clients.

\* \* \* \* \*